US011882821B1

(12) United States Patent
Norton

(10) Patent No.: US 11,882,821 B1
(45) Date of Patent: Jan. 30, 2024

(54) METHOD AND APPARATUS FOR INSECT ERADICATION

(71) Applicant: Carroll Lee Norton, Bay Minette, AL (US)

(72) Inventor: Carroll Lee Norton, Bay Minette, AL (US)

(*) Notice: Subject to any disclaimer, the term of this patent is extended or adjusted under 35 U.S.C. 154(b) by 0 days.

(21) Appl. No.: 18/232,930

(22) Filed: Aug. 11, 2023

(51) Int. Cl.
*A01M 17/00* (2006.01)

(52) U.S. Cl.
CPC ....... *A01M 17/002* (2013.01); *A01M 2200/01* (2013.01)

(58) Field of Classification Search
CPC .............. A01M 17/002; A01M 17/004; A01M 25/006; A01C 23/02
USPC .... 47/48.5; 43/124, 134–135, 138, 141, 144
See application file for complete search history.

(56) References Cited

U.S. PATENT DOCUMENTS

| | | | | |
|---|---|---|---|---|
| 1,570,087 A | * | 1/1926 | Louis | A01C 7/18 111/98 |
| 1,856,809 A | * | 5/1932 | Gibson | A01M 25/006 43/124 |
| 1,868,235 A | * | 7/1932 | Jaden | A01M 17/002 222/332 |
| 2,083,153 A | | 6/1937 | Irish | |
| 2,116,591 A | * | 5/1938 | Barber | A01G 7/06 101/50 |
| 2,323,773 A | * | 7/1943 | Irish | A01M 17/002 111/7.1 |
| 2,390,686 A | * | 12/1945 | Bishop | A01M 25/006 111/95 |
| 2,707,068 A | * | 4/1955 | Williamson | A01M 25/006 222/324 |
| 2,783,581 A | * | 3/1957 | Lee | A01M 25/006 111/95 |
| 2,800,865 A | * | 7/1957 | Gathercoal | A01C 23/026 111/99 |
| 2,860,586 A | * | 11/1958 | Nozell | A01G 29/00 111/95 |
| 2,906,056 A | | 9/1959 | Youngblood | |
| 3,166,034 A | * | 1/1965 | Haroldson | A01G 29/00 111/7.3 |
| 4,129,231 A | * | 12/1978 | Larson | B05B 7/12 222/145.5 |

(Continued)

FOREIGN PATENT DOCUMENTS

FR 930266 A * 1/1948

*Primary Examiner* — Magdalena Topolski
*Assistant Examiner* — Morgan T Jordan
(74) *Attorney, Agent, or Firm* — George L Williamson

(57) ABSTRACT

Method and apparatus for eradicating insects in both a below ground and above ground environment. The device includes a main shaft having a bore therein and a two-piece clamshell on one end for insertion into the insect bed and on the other end a main body which includes a hand grip and a lever for releasing the gas which is held in a separate gas cylinder. The gas flows through a gas tube from the gas cylinder through the main shaft and then out the clamshell end of the main shaft into an insect bed. Two inert gases are used to displace the air in the insect colony wherein the two inert gases are argon and helium. The argon gas is used for underground applications and the helium gas is used for above ground and underground above grade applications. The two-piece clamshell is used for insertion into the ground where it is opened thereby allowing the gas to escape from the gas tube contained inside the clamshell.

20 Claims, 4 Drawing Sheets

(56) References Cited

U.S. PATENT DOCUMENTS

| | | | | |
|---|---|---|---|---|
| 4,715,516 A | * | 12/1987 | Salvail | B67D 3/044 |
| | | | | 222/487 |
| 4,756,118 A | * | 7/1988 | Evans, II | A01M 1/2094 |
| | | | | 43/132.1 |
| 4,833,818 A | | 5/1989 | Berta | |
| 4,934,287 A | * | 6/1990 | Guin | A01C 23/026 |
| | | | | 111/7.1 |
| 5,050,340 A | * | 9/1991 | Seifert | A01C 23/026 |
| | | | | 239/271 |
| 5,109,628 A | | 5/1992 | Ellefson | |
| 5,325,626 A | | 7/1994 | Jackson | |
| 5,390,440 A | * | 2/1995 | Mihealsick | A01M 1/245 |
| | | | | 43/124 |
| 5,394,643 A | | 3/1995 | Schmittmann | |
| 5,570,840 A | * | 11/1996 | Gettinger | B05B 7/2416 |
| | | | | 239/361 |
| 5,727,484 A | * | 3/1998 | Childs | A01C 23/026 |
| | | | | 239/271 |
| 6,036,057 A | * | 3/2000 | Poutiatine | B05B 11/1083 |
| | | | | 222/137 |
| 6,907,690 B1 | | 6/2005 | Stallings | |
| 6,925,751 B2 | * | 8/2005 | Williams | B05B 15/63 |
| | | | | 47/1.41 |
| 7,165,357 B2 | * | 1/2007 | Burgess | A01G 7/06 |
| | | | | 47/57.5 |
| 7,797,878 B2 | | 9/2010 | Schuster | |
| 8,529,248 B2 | * | 9/2013 | Clement | F23D 14/465 |
| | | | | 43/144 |
| 9,541,076 B1 | * | 1/2017 | Weiss | F04B 9/14 |
| 9,949,449 B2 | * | 4/2018 | Ryan | A01G 29/00 |
| 2003/0053955 A1 | | 3/2003 | Taylor | |
| 2003/0159630 A1 | * | 8/2003 | Rollins | A01B 1/00 |
| | | | | 111/7.4 |
| 2004/0255512 A1 | * | 12/2004 | Burgess | A01G 7/06 |
| | | | | 47/57.5 |
| 2005/0144832 A1 | * | 7/2005 | Shaffer | A01M 17/004 |
| | | | | 43/124 |
| 2005/0279017 A1 | * | 12/2005 | James | A01M 17/002 |
| | | | | 43/132.1 |
| 2015/0033616 A1 | * | 2/2015 | Kazzaz | A01M 25/006 |
| | | | | 43/124 |
| 2017/0120266 A1 | * | 5/2017 | Fu | B05B 7/064 |

* cited by examiner

METHOD AND APPARATUS FOR INSECT ERADICATION

BACKGROUND OF THE INVENTION

Field of the Invention

The present invention relates generally to insect eradication and, more particularly, is concerned with a method and process for eradicating insects in both above ground and below ground environments.

Description of the Related Art

Devices relevant to the present invention have been described in the related art; however, none of the related art devices disclose the unique features of the present invention. In U.S. Pat. No. 5,394,643 dated Mar. 7, 1995, Schmittmann disclosed a fumigant fluid. In U.S. Pat. No. 4,833,818 dated May 30, 1989, Berta disclosed a method for exterminating subterranean animals. In U.S. Pat. No. 6,907,690 dated Jun. 21, 2005, Stallings disclosed an environmentally friendly insect eradication method and apparatus. In U.S. Pat. No. 2,083,153 dated Jun. 8, 1937, Irish disclosed an apparatus for the treatment of soil. In U.S. Pat. No. 7,797,878 dated Sep. 21, 2010, Schuster disclosed a fire ant suppression system. In U.S. Pat. No. 2,906,056 dated Sep. 29, 1959, Youngblood disclosed an exterminating device and system. In U.S. Pat. No. 5,325,626 dated Jul. 5, 1994, Jackson disclosed a fire ant pesticide dispenser apparatus. In U.S. Pat. No. 5,109,628 dated May 5, 1992, Ellefson disclosed a mole and gopher apparatus. In U.S. Patent Application Publication No. 2003/0053955 dated Mar. 20, 2003, Taylor disclosed an insect pest eradication system.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a method and apparatus for eradicating insects in both a below ground and above ground environment. The present invention includes a main shaft having a bore therein and having on one end a two-piece clamshell for insertion into an insect bed and from which gas flows into the insect bed and on the opposite end of the main shaft having a main body which includes a hand grip and a lever for releasing the gas which is held in a separate gas cylinder. The gas flows through a gas tube from the gas cylinder through the main shaft and then out the clamshell end of the main shaft into an insect bed which is disposed in the ground. The treatment process is accomplished by using one of two inert gases to displace the air in the insect colony wherein the two inert gases are argon and helium. Both of the gases cause asphyxiation of the insects without any interaction with the surrounding environment making them inherently more environmentally friendly. The argon gas, being heavier than air, is used for underground applications and the helium gas, which is lighter than air, is used for above ground applications. The two-piece clamshell is used for insertion into the ground where it is then opened thereby allowing the gas to escape from the gas tube contained inside the clamshell so as to prevent the gas tube from becoming clogged with soil.

An object of the present invention is to eradicate insects. A further object of the present invention is to use inert gases, argon and helium, to eradicate the insects wherein the argon is used for below ground applications and helium is used for above ground applications. A further object of the present invention is to provide a tool which can be injected into the soil of the insect colony without allowing the gas tube to become clogged with dirt or soil. A further object of the present invention is to provide a system for eradicating insects which would be harmless to humans and the environment. A further object of the present invention is to provide a system for eradicating insects which reduces the normal oxygen supply in the vicinity of the insects to the extent that the insects are rapidly suffocated. A further object of the present invention is to provide a system for eradicating insects which can be easily operated by a user. A further object of the present invention is provide a system for eradicating insects which can be relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
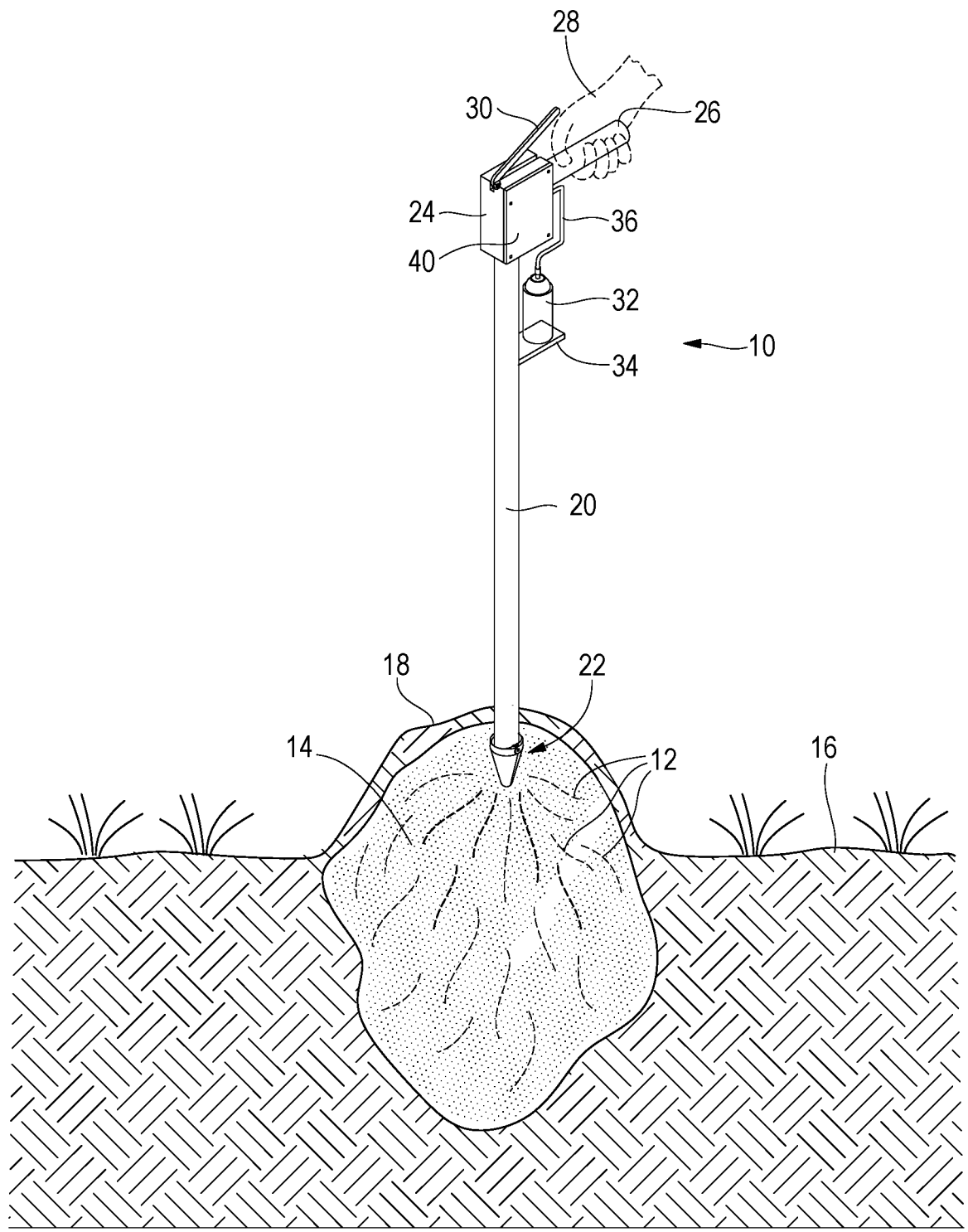
FIG. 1 is a perspective view of the present invention shown in operative connection.

With regard to reference numerals used, the following numbering is used throughout the drawings.

10 present invention
12 gas
14 insect/ant bed
16 ground
18 surface of mound
20 main shaft
22 clamshell 22L left side of clamshell
22R right side of clamshell
23 space
24 main body
26 hand grip
28 user
30 two stage lever
31 lower edge of lever
32 gas cylinder
34 seat/platform
36 gas tube
38 actuator rod
39 top of actuator rod
40 cover plate
42 pivot for lever
44 quick connect fitting
46 conduit
48 spring
50 valve
52 main pivoting hinge of clamshell
54 main pivot of arm
56L left link/arm to open/close clamshell
56R right link/arm to open/close clamshell
58L pivot
58R pivot
60 outlet end
62 internal bore of main shaft
64 valve actuation pin
66 extension pin for valve
68 top of extension pin for valve
70 indention for gas tube

DETAILED DESCRIPTION OF THE
PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 9 illustrate the present invention wherein a method and apparatus for eradicating insects is disclosed and which is generally indicated by reference number 10.

Turning to FIG. 1, therein is shown the present invention 10 which discloses a method and apparatus for injecting gas 12 into an insect/ant bed or nest 14 which is under the ground 16 or may extend above the ground so as to have a surface of the mound 18 above the ground. The present invention 10 includes a main shaft 20 having a cone-shaped clamshell 22 on one end which clamshell is used for insertion into the soil of the insect bed 14. Shown on the opposite end of the main shaft 20 is the main body 24 which includes a hand grip 26 for being held in the hand of a user 28 and also includes a movable lever 30 which is used to open the clamshells along with a gas cylinder 32 which is mounted onto a seat/platform 34 which seat is disposed on the main shaft 20 and also including a gas tube 36 which provides a conduit for the gas to flow from the gas cylinder 32 through the main shaft 20 and out the opposite end of the gas tube 36 through the clamshells 22 which will be hereinafter explained. The clamshell 22 is also removable from the main shaft 20 so that the present invention 10 may be used without clamshell 22.

Figure 2:
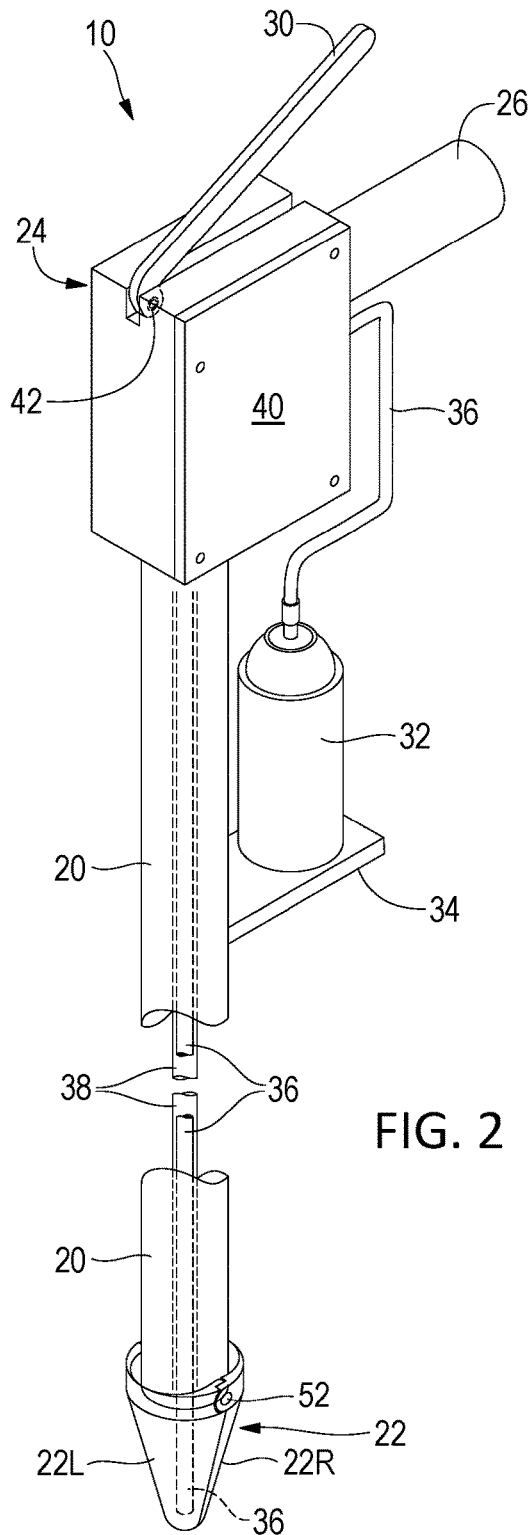
FIG. 2 is a perspective view of the present invention showing the clamshell closed.

Turning to FIG. 2, therein is shown the present invention 10 including the main shaft 20 having the clamshell 22 on a lower end which clamshell 22 includes a left portion 22L and a right portion 22R along with main pivot 52. Also shown is the main body 24 including the hand grip 26 and the lever 30 wherein the gas cylinder 32 contains the inert gas which is disposed on a seat 34 attached to the main shaft 20 along with a gas tube 36 extending from the gas cylinder 32 through the main body 24 down the main shaft 20 and into the end of the clamshell 22. Also shown is an actuator rod 38 which extends from proximate the lever 30 downwardly through the main shaft 20 and into the vicinity proximate the clamshell 22 which actuator rod 38 is used to open and close the clamshell 22. Also shown is cover plate 40 which is used on the main body 24 to provide internal access along with a pivot 42 upon which lever 30 pivots. Gas cylinder 32 provides a source of pressurized gas and may be strapped to the main shaft 20 using a variety of means.

Figure 3:
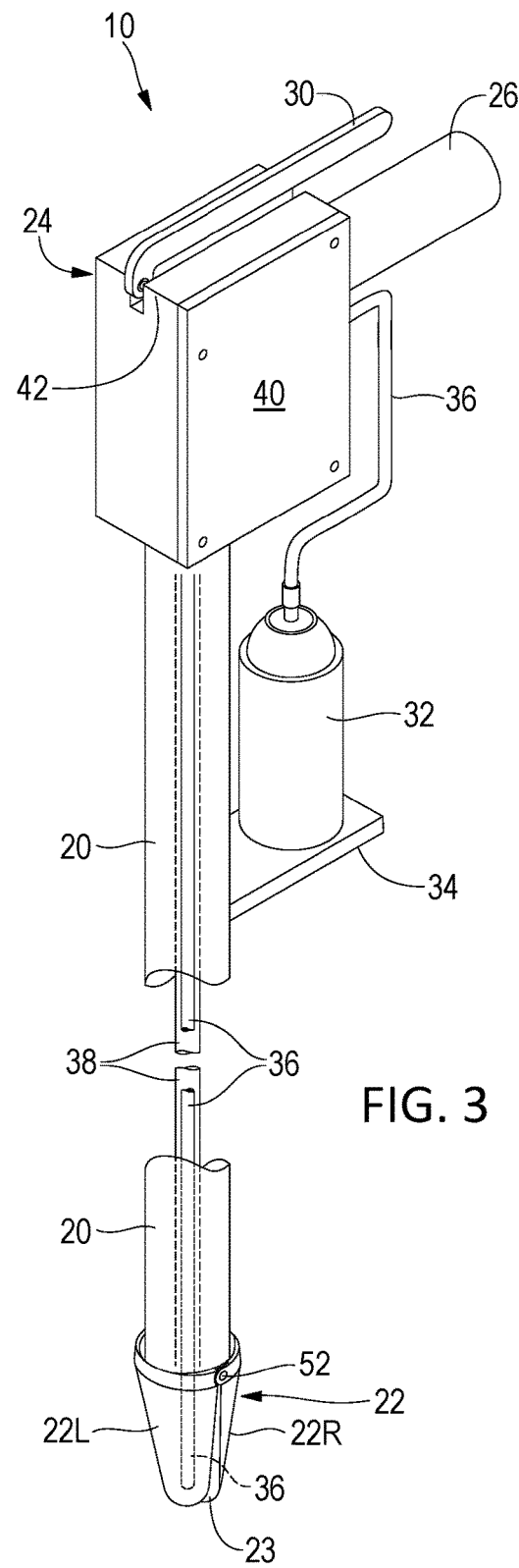
FIG. 3 is a perspective view of the present invention showing the clamshell open.

Turning to FIG. 3, therein is shown are the same components as previously disclosed in FIG. 2 except that the clamshell 22 is shown open illustrating movement of the left side 22L and the right side 22R to form a space 23 in between the open halves 22L, 22R. Other previously disclosed elements are also shown.

Figure 4:
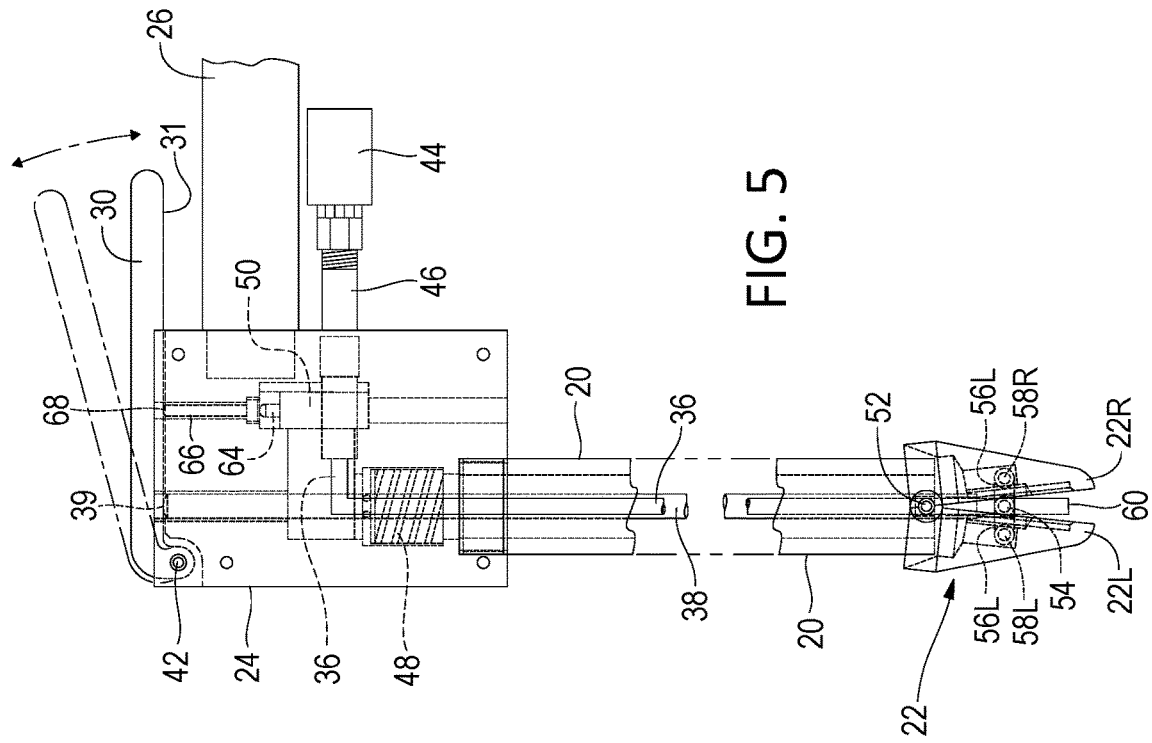
FIG. 4 is a side elevation view of the present invention showing the clamshell closed.
Figure 5:
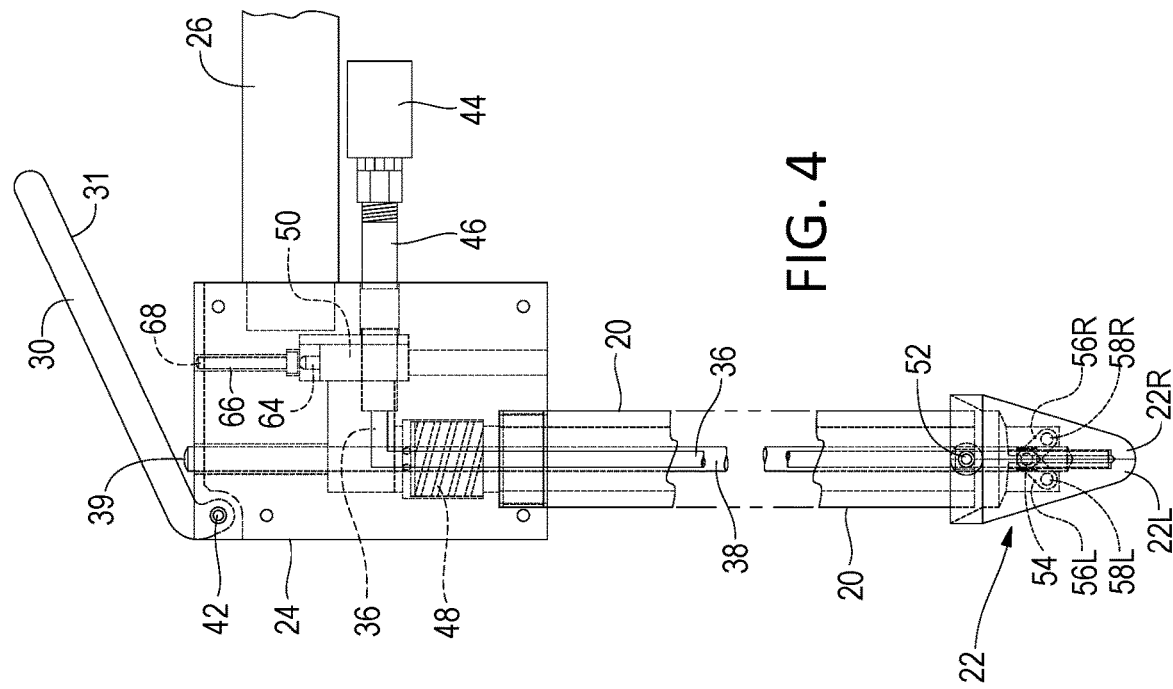
FIG. 5 is a side elevation view of the present invention showing the clamshell open.

Turning to FIG. 4, therein is shown the present invention 10 including the main shaft 20 having clamshell 22 including left and right portions 22L, 22R in the closed position on one end and including the main body 24 on the other end including the hand grip 26 and the lever 30. Also shown attached to the main body 24 is a quick connect fitting 44 which is used for easily attaching the gas cylinder (not shown) so that gas can flow through the quick connect fitting 44 through the conduit 46 and then into and through the flow control valve 50 and then through the gas tube 36 which extends downwardly through the main shaft 20 and into the vicinity of the distal end of the clamshell 22 so that when the clamshell 22 is inserted into the insect bed, gas will be injected from a gas cylinder through the gas tube 36 into the insect bed. Also shown is the elongated actuator rod 38 which is used to open the clamshells along with the pivot 42 upon which the lever 30 operates. Also shown is spring 48 which is used to maintain the actuator rod 38 in the normally up position wherein the spring 48 biases the actuator rod upwardly so that the clamshell 22 is in the closed position. Also shown on the clamshell 52 is the main pivoting hinge 52 of the clamshell which allows the left and right clamshells 22L, 22R to open and close. A pair of oppositely disposed links or arms 56L, 56R are used to open and close the halves of the clamshell 22 wherein the arms are pivotally attached at a centrally disposed main pivot 54 which is disposed on a lower end of the actuator rod 38 so that when the actuator rod 38 is moved to an opening or extended position, the clamshell is opened and when the actuator rod 38 is moved to a closed or retracted position the clamshell is closed. Also shown are a pivot point 58L, 58R which allow the links/arms 56L, 56R to be attached to the clamshell halves 22L, 22R so that they can be manually opened and closed by the actuator rod 38 being operated by the lever 30 which is manually operated by a hand of a user. This is accomplished by having the lower edge 31 of the lever 30 physically and directly contact the top 39 of actuator rod 38 and thereby push the rod downwardly (as shown in FIG. 5) thereby opening the clamshell 22; when the rod 38 is released spring 48 moves rod 38 back to its normally upward position. Valve 50 being normally closed operates in a similar way as it has valve actuation pin 64 which is normally in an upward position along with an extension pin 66 having a top 68 which is contacted by the lower edge 31 of lever 30 and forced downwardly as shown in FIG. 5.

Turning to FIG. 5, therein is shown the present invention 10 showing all the items as previously disclosed in FIG. 4, but showing the clamshells 22L, 22R in an open position wherein the links/arms 56L, 56R are in an oppositely disposed open position when the arms are extended away from each other so that the outlet end 60 of the gas tube 36 is shown. One skilled in the art would understand that the clamshells 22L, 22R are maintained in the closed position as the present invention is inserted into the insect bed and then the clamshells 22L, 22R are open by depressing the lever 30 on the main body 24 so that the actuator rod 38 is extended so that the hinge arms 56L, 56R are manually moved into the opposing position so that the clamshell halves 22L, 22R are opened. Lever 30 is shown depressed downwardly so that its lower edge 31 contacts the tops of the actuator rod 38 and extension pin 66 for valve 50 so that the clamshell 22 is opened allowing gas to escape from the outlet end 60 of the gas tube 36 into the insect bed. Also lever 30 is shown in an intermediate position (see phantom line portion of drawing) wherein its lower edge 31 would contact the actuator rod 38 to open the clamshell 22 but not the extension pin 66 so that only the clamshell 22 is opened but no gas is released into the insect bed. Operation of the actuator rod 30 alone may be referred to as stage one operation and then the opening of the valve 50 and actuator rod 30 together is referred to as stage two operation.

Figure 6:
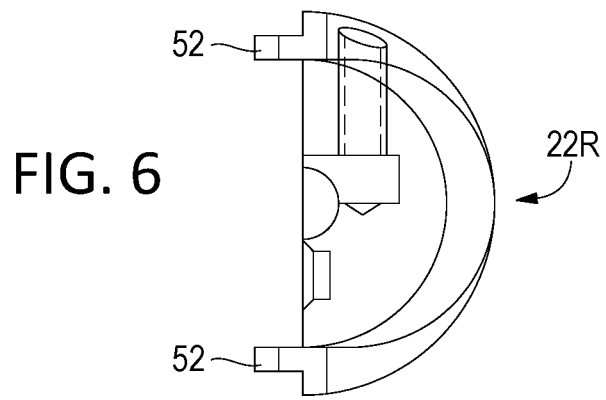
FIG. 6 is a top elevation view of the right-hand clamshell.

Turning to FIG. 6, therein is shown clamshell half 22R along with pivot 52.

Figure 7:
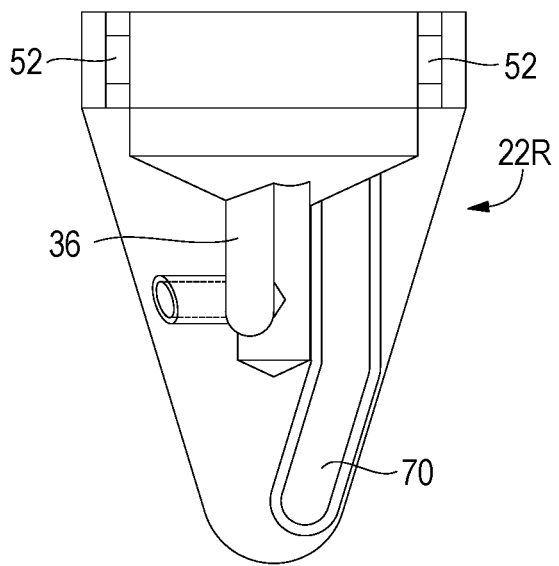
FIG. 7 is a side elevation view of the right-hand clamshell.

Turning to FIG. 7, therein is shown clamshell half 22R along with pivot 52 and right link/arm 56R used to open/close the clamshell with main pivot 54 and pivot 58R along with lower ends of the actuator rod 38 and gas tube 36.

Figure 8:
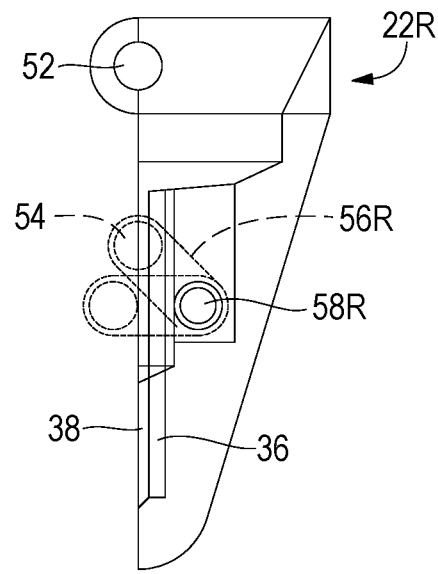
FIG. 8 is a side elevation view of the right-hand clamshell.

Turning to FIG. 8, therein is shown therein is shown clamshell half 22R along with pivot 52 and right link/arm 56R used to open/close the clam shell with main pivot 54 and pivot 58R along with lower ends of the actuator rod 38 and gas tube 36.

Figure 9:
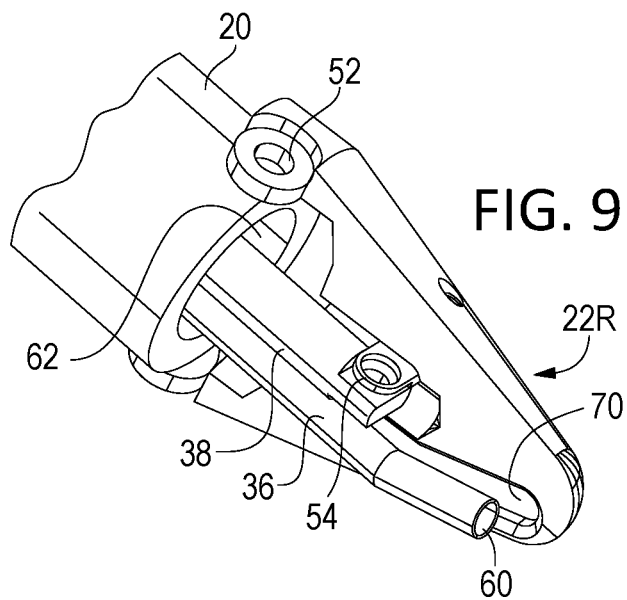
FIG. 9 is a perspective view of the right-hand clamshell.

Turning to FIG. 9, therein is shown the right half 22R of clamshell 22 including the lower end of the main shaft 20 wherein the clamshell half 22R is pivotally attached at 52 to the main shaft 20 and also showing the internal bore 62 along with the lower end of the actuator rod 38 showing the main pivot 54 for the arm along with the lower end of the gas tube 36 including its lower outlet 60 from which gas is injected into the ant/insect bed as previously disclosed. Indention 70 is shown in the wall of the clamshell 22R for receiving the gas tube 36 therein.

By way of summary and by making reference to FIGS. 1-9, the present invention discloses a device of eradicating insects in an insect nest 14 including an elongated main shaft 20 having a main body 24 on a proximate end thereof and a clamshell 22 on a distal end thereof wherein the main shaft has a bore 62 therein with a hand grip 26 on the main body for being grasped by a hand of a user 28 and providing a lever 30 being pivotally 42 attached to the main body and a source of pressurized gas 32 on the main shaft and extending a gas tube 36 from the source of pressurized gas through the bore to a point proximate the clamshell. Also, shown are opposing first and second halves 22L, 22R on the clamshell being pivotable at 52 between a closed position for insertion into the insect nest and an open position for releasing the pressurized gas into the insect nest, wherein the lever 30 has an open position when the clamshell is closed, an intermediate position when the clamshell is opened, and a fully depressed position when the pressurized gas is released into the insect nest. Also shown is an actuator rod 38 extending through the bore having first and second ends, wherein the first end is adapted for contacting the lever and the second end extends to the clamshell for urging the first and second halves into the open position when the lever is in the intermediate position and releasing pressurized gas into the insect nest when the lever is in the fully depressed position and the clamshell is open as shown in FIGS. 4 and 5.

Additional general information follows and makes reference to FIG. 1-9. The present invention 10 is unique for treating and eradicating a broad spectrum of insect colonies such as fire ants, yellow jackets, wasps, honeybees, termites and others. The treatment is accomplished using one of two inert gases to displace the air in the insect colony. The two inert gases are argon and helium. Both of these gases cause asphyxiation of the insects without any interaction with the surroundings, making them inherently more environmentally friendly than pesticides.

For underground treatments, such as fire ants, pressurized argon is inserted into the colony utilizing the present invention 10 that pierces the ground with the gas tube protected from clogging by a clamshell that opens after insertion. Once opened, the argon gas can be released at a pressure of 0.5 psi to 20 psi depending upon the earth type, depth of penetration, insect targeted, volume of space and size of the colony. The duration of gas insertion will vary from 1 second to several minutes, generally based on the same variables.

For above ground treatments, or underground chambers that extend above grade like termite colonies and honeybees, red wasp and other infestations in houses and buildings, helium gas is inserted utilizing the present invention 10 with the clamshell 22 removed that allows the helium to saturate the colony using similar pressures and durations as the argon option.

The present invention 10 features a two-step activation process that prevents accidental discharge of gas, providing additional safety for the operator during applications and transportation. In addition, there is no setup time required for the present invention 10 in subterranean applications as it is simply pushed into the ground, the lever 30 is depressed in stage one, and the gas release is activated in stage two of the lever 30 operation as previously explained. This simplification allows a very large number of treatment sites per day.

The system and the present invention 10 are designed to be versatile in application, from small properties to very large properties. A small bottle of noble gas can be mounted on the present invention 10 for use around a flower bed or a yard where there are just a few applications needed, such as a homeowner on a do-it-yourself basis. It is also capable of being used on larger properties where a worker with a larger bottle in a backpack or the like, can do more applications around a larger property such as a commercial property. Or, it can be used on large properties like golf courses and agricultural fields by mounting a much larger bottle on a cart or the like, where the worker can ride from one application site to another application site and apply the process to many sites very quickly without leaving the cart.

Because the applied gases are inert, they are safe for gardens and agricultural crops. This is a major difference from many of the pesticides that present a health hazard to families and pets.

For subterranean applications, the process is to identify the perimeter of the infestation and investigate for any apparent hazardous or dangerous conditions for either the operator or the property. Following that initial inspection, the operator calculates the approximate volume of inert gas needed to permeate the voids of the insect bed. The desirable penetration point(s) is identified, and the application tool is deployed, with the tip of the present invention 10 inserted and the protective clamshell is then opened in the first stage of the lever operation. The lever is further depressed (stage two) for release of the appropriate volume of gas. After releasing the gas, a waiting period of approximately three minutes is required before verifying the targeted species of infestation has been eradicated. On rare occasions, additional release of gas may be required.

A similar inspection of above ground infested areas is conducted to identify the type of structure and volume of gas calculations necessary. In addition, any area of a structure, such as a home or office building, shop or other manmade enclosure, is inspected to identify potential leaks of inert gas. Areas that pose a risk to occupants or pets are sealed off with tape and/or plastic sheeting to control the gas. Penetration points are identified for insertion of the present invention 10 and then it is determined whether or not the present invention 10 is used with the removable clamshell 22 or just the tubing 36. In some cases, small holes will need to be drilled for gas insertion. A similar waiting period to ascertain effectiveness is employed and remedial treatment used if necessary. All containment is then removed and air is blown into the void(s) to clear residual gas.

Left and right side designations regarding the present invention 10 are interpreted from the view of one looking into the page on which a drawing is shown. Also, lines with arrowheads are sometimes placed on drawings to indicate potential motion or direction of movement of an item illustrated in the drawing.

A feature illustrated in one of the figures may be the same as or similar to a feature illustrated in another of the figures. Similarly, a feature described in connection with one of the figures may be the same as or similar to a feature described in connection with another of the figures. The same or similar features may be noted by the same or similar reference characters unless expressly described otherwise. Additionally, the description of a particular figure may refer to a feature not shown in the particular figure. The feature may be illustrated in and/or further described in connection with another figure.

Elements of processes (i.e. methods) described herein may be executed in one or more ways such as by a human, by a processing device, by mechanisms operating automatically or under human control, and so forth. Additionally, although various elements of a process may be depicted in the figures in a particular order, the elements of the process may be performed in one or more different orders without departing from the substance and spirit of the disclosure herein.

The foregoing description sets forth numerous specific details such as examples of specific systems, components, methods and so forth, in order to provide a good understanding of several implementations. It will be apparent to one skilled in the art, however, that at least some implementations may be practiced without these specific details. In other instances, well-known components or methods are not described in detail or are presented in simple block diagram format in order to avoid unnecessarily obscuring the present implementations. Thus, the specific details set forth above are merely exemplary. Particular implementations may vary from these exemplary details and still be contemplated to be within the scope of the present implementations.

Related elements in the examples and/or embodiments described herein may be identical, similar, or dissimilar in different examples. For the sake of brevity and clarity, related elements may not be redundantly explained. Instead, the use of a same, similar, and/or related element names and/or reference characters may cue the reader that an element with a given name and/or associated reference character may be similar to another related element with the same, similar, and/or related element name and/or reference character in an example explained elsewhere herein. Elements specific to a given example may be described regarding that particular example. A person having ordinary skill in the art will understand that a given element need not be the same and/or similar to the specific portrayal of a related element in any given figure or example in order to share features of the related element.

It is to be understood that the foregoing description may be intended to be illustrative and not restrictive. Many other implementations will be apparent to those of skill in the art upon reading and understanding the above description. The scope of the present implementations should, therefore, be determined with reference to the appended claims, along with the full scope of equivalents to which such claims are entitled.

The foregoing disclosure encompasses multiple distinct examples with independent utility. While these examples have been disclosed in a particular form, the specific examples disclosed and illustrated above are not to be considered in a limiting sense as numerous variations are possible. The subject matter disclosed herein includes novel and non-obvious combinations and sub-combinations of the various elements, features, functions and/or properties disclosed above both explicitly and inherently. Where the disclosure or subsequently filed claims recite "a" element, "a first" element, or any such equivalent term, the disclosure or claims is to be understood to incorporate one or more such elements, neither requiring nor excluding two or more of such elements.

As used herein "same" means sharing all features and "similar" means sharing a substantial number of features or sharing materially important features even if a substantial number of features are not shared. As used herein "may" should be interpreted in a permissive sense and should not be interpreted in an indefinite sense. Additionally, use of "is" regarding examples, elements, and/or features should be interpreted to be definite only regarding a specific example and should not be interpreted as definite regarding every example. Furthermore, references to "the disclosure" and/or "this disclosure" refer to the entirety of the writings of this document and the entirety of the accompanying illustrations, which extends to all the writings of each subsection of this document, including the Title, Background, Brief description of the Drawings, Detailed Description, Claims, Abstract, and any other document and/or resource incorporated herein by reference.

As used herein regarding a list, "and" forms a group inclusive of all the listed elements. For example, an example described as including A, B, C, and D is an example that includes A, includes B, includes C, and also includes D. As used herein regarding a list, "or" forms a list of elements, any of which may be included. For example, an example described as including A, B, C, or D is an example that includes any of the elements A, B, C, and D. Unless otherwise stated, an example including a list of alternatively-inclusive elements does not preclude other examples that include various combinations of some or all of the alternatively-inclusive elements. An example described using a list of alternatively inclusive elements includes at least one element of the listed elements. However, an example described using a list of alternatively inclusive elements does not preclude another example that includes all of the listed elements. An example described using a list of alternatively inclusive elements does not preclude another example that includes a combination of some of the listed elements. As used herein regarding a list, "and/or" forms a list of elements inclusive alone or in any combination. For example, an example described as including A, B, C, and/or D is an example that may include: A alone; A and B; A, B and C; A, B, C, and D; and so forth. The bounds of an "and/or" list are defined by the complete set of combinations and permutations for the list.

Where multiples of a particular element are shown in a FIG., and where it is clear that the element is duplicated throughout the FIG., only one label may be provided for the element, despite multiple instances of the element being present in the FIG. Accordingly, other instances in the FIG. of the element having identical or similar structure and/or function may not have been redundantly labeled. A person having ordinary skill in the art will recognize based on the disclosure herein redundant and/or duplicated elements of the same FIG. Despite this, redundant labeling may be included where helpful in clarifying the structure of the depicted examples.

The Applicant(s) reserves the right to submit claims directed to combinations and sub-combinations of the disclosed examples that are believed to be novel and non-obvious. Examples embodied in other combinations and sub-combinations of features, functions, elements and/or properties may be claimed through amendment of those claims or presentation of new claims in the present application or in a related application. Such amended or new claims, whether they are directed to the same example or a different example and whether they are different, broader, narrower or equal in scope to the original claims, are to be considered within the subject matter of the examples described herein.

I claim:

1. An insect eradicator having an elongated shaft for insertion into an insect nest, comprising:
   (a) a main shaft having a main body on a proximate end thereof and a clamshell on a distal end thereof, said main shaft having a bore therein;
   (b) said main body having a hand grip for being grasped by a hand of a user and a lever being pivotally attached thereto;
   (c) a source of pressurized gas disposed on said main shaft and a gas tube extending from said source of pressurized gas through said bore to a point proximate said clamshell;
   (d) said clamshell having opposing first and second halves pivoting between a closed position for insertion into the insect nest and an open position for releasing said pressurized gas into the insect nest;
   (e) wherein said lever has an open position wherein said clamshell is closed, an intermediate position wherein said clamshell is opened and said source of pressurized gas is closed, and a fully depressed position wherein said pressurized gas is released into the insect nest;
   (f) an actuator rod extending through said bore having first and second ends, wherein said first end is adapted for contacting said lever and said second end extends to said clamshell for urging said first and second halves into said open position when said lever is in said intermediate position; and
   (g) wherein said pressurized gas is released into the insect nest when said lever is in said fully depressed position and said clamshell is open.

2. The insect eradicator of claim 1, wherein said pressurized gas consists of argon for use when the insect nest is below ground.

3. The insect eradicator of claim 1, wherein said pressurized gas consists of helium for use when the insect nest is above ground and underground above grade.

4. The insect eradicator of claim 1, further comprising a spring for biasing said first end of said actuator rod toward said lever so that said first and second halves of said clamshell are biased to the closed position.

5. The insect eradicator of claim 4, wherein said first end of said actuator rod contacts a lower edge of said lever when said lever is moved to said intermediate position.

6. The insect eradicator of claim 1, further comprising a valve disposed in said gas tube, wherein said valve is normally closed so that said pressurized gas is normally closed and cannot be released when said lever is in said open position.

7. The insect eradicator of claim 6, wherein said valve is adapted to be opened when said lever is in said fully depressed position allowing release of said pressurized gas.

8. The insect eradicator of claim 7, wherein said valve is adapted to be opened by contacting said lower edge of said lever.

9. The insect eradicator of claim 1, further comprising first and second link arms adapted for connection to said second end of said actuator rod for moving said first and second halves of said clamshell back and forth between said open and said closed positions.

10. A method of eradicating insects in an insect nest, comprising the steps of:
    (a) providing an insect eradicator having an elongated main shaft having a main body on a proximate end thereof and a clamshell on a distal end thereof, the main shaft having a bore therein;
    (b) providing a hand grip on the main body for being grasped by a hand of a user and providing a lever being pivotally attached to the main body;
    (c) disposing a source of pressurized gas on the main shaft and extending a gas tube from the source of pressurized gas through the bore to a point proximate the clamshell;
    (d) providing opposing first and second halves on the clamshell being pivotable between a closed position for insertion into the insect nest and an open position for releasing the pressurized gas into the insect nest;
    (e) wherein the lever has an open position wherein the clamshell is closed, an intermediate position wherein the clamshell is opened and the source of pressurized gas is closed, and a fully depressed position wherein the pressurized gas is released into the insect nest;
    (f) providing an actuator rod extending through the bore having first and second ends, wherein the first end is adapted for contacting the lever and the second end extends to the clamshell for urging the first and second halves into the open position when the lever is in the intermediate position; and
    (g) releasing pressurized gas into the insect nest when the lever is in the fully depressed position and the clamshell is open.

11. The method of claim 10, wherein the pressurized gas consists of argon for use when the insect nest is below ground.

12. The method of claim 10, wherein the pressurized gas consists of helium for use when the insect nest is above ground and underground above grade.

13. The method of claim 10, further comprising the step of providing a spring for biasing the first end of the actuator rod toward the lever so that the first and second halves of the clamshell are biased to the closed position.

14. The method of claim 13, wherein the first end of the actuator rod contacts a lower edge of the lever when the lever is moved to the intermediate position.

15. The method of claim 10, further comprising the step of providing a valve disposed in the gas tube, wherein the valve is normally closed so that the pressurized gas is normally closed and cannot be released when the lever is in the open position.

16. The method of claim 15, wherein the valve is adapted to be opened when the lever is in the fully depressed position allowing release of the pressurized gas.

17. The method of claim 16, wherein the valve is adapted to be opened by contacting the lower edge of the lever.

18. The method of claim 10, further comprising the step of providing first and second link arms adapted for connection to the second end of the actuator rod for moving the first and second halves of the clamshell back and forth between the open position and the closed position.

19. The insect eradicator of claim 1, wherein said clamshell is fixedly removably disposed on said main shaft.

20. The method of claim 10, wherein the clamshell is fixedly removably disposed on the main shaft.

* * * * *